July 8, 1952 W. A. SHERBONDY 2,602,571
DISPENSING DEVICE FOR CALKING MATERIAL AND THE LIKE
Filed Feb. 21, 1950
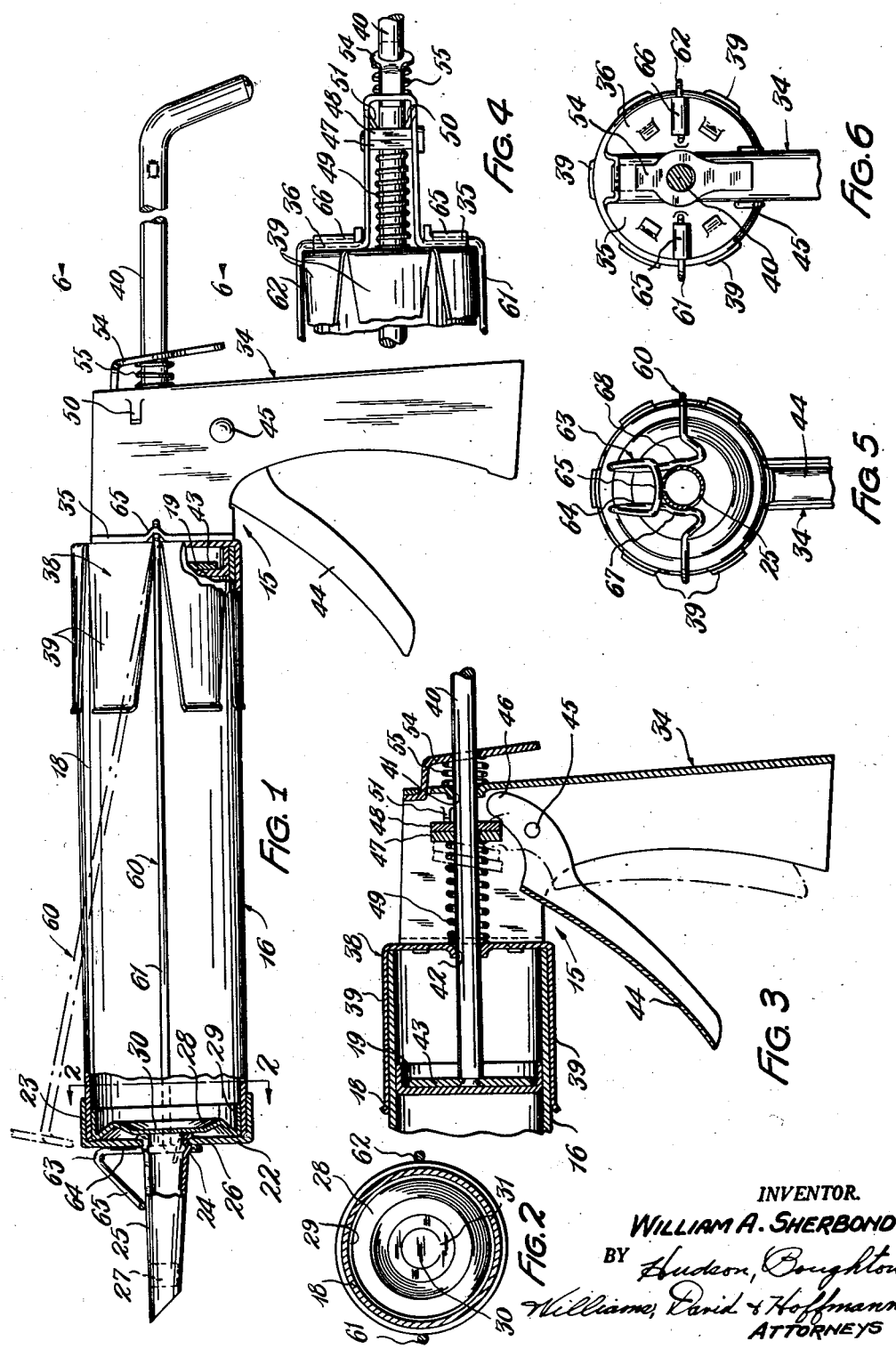
INVENTOR.
WILLIAM A. SHERBONDY
BY Hudson, Boughton,
Williams, David & Hoffmann.
ATTORNEYS

Patented July 8, 1952

2,602,571

UNITED STATES PATENT OFFICE 2,602,571

DISPENSING DEVICE FOR CALKING MATERIAL AND THE LIKE

William A. Sherbondy, Shaker Heights, Ohio

Application February 21, 1950, Serial No. 145,471

8 Claims. (Cl. 222—327)

The present invention relates to dispensers for calking material and the like, and particularly to dispensers having a plunger carrying hand grip assembly to which a tubular cartridge of calking material, or the like, can be removably attached in operative relation with the plunger by a bail, or bail like member.

The principal object of the invention is the provision of a new and improved dispenser for calking material and the like, which dispenser comprises a plunger carrying hand grip assembly having a seat adapted to receive one end of a material containing cartridge having a discharge opening at the other end, and a bail including two parallel legs pivoted to the assembly and a cross portion interconnecting said legs and adapted to extend across the discharge end of the cartridge and hold it in place, the cross portion of the bail having a forwardly projecting member adapted to engage the side of a spout associated with the cartridge discharge opening and provide bracing for the spout. In a preferred form of the invention the bail is formed of wire, including the cross portion, which portion has a substantially U-shaped section of less width than the diameter of the cartridge the loop end of which is bent forwardly and back upon itself to form a support for a spout associated with the cartridge and a handle means by which the bail may be moved into and out of operative position with respect to the cartridge.

Another object of the invention is the provision of a new and improved viscous material cartridge, such as a calking compound cartridge, for use with a dispenser having a plunger which enters the cartridge to force the material therefrom, and which cartridge includes a closure plate at the discharge end having a flap or door cut therein which is closed until the material in the cartridge is forced thereagainst by operation of the plunger, under which pressure the flap yields to allow discharge of the material from the cartridge.

The invention resides in certain constructions and combinations and arrangements of parts and further objects and advantages will be apparent to those skilled in the art to which it relates from the following description of a preferred embodiment described with reference to the accompanying drawings forming a part of this specification, in which:

Fig. 1 is a side elevational view, partly broken away, of a calking material dispenser embodying the invention;

Fig. 2 is a sectional view taken on line 2—2 of Fig. 1;

Fig. 3 is a fragmentary sectional view of one end of the calking material dispenser having a calking material cartridge associated therewith;

Fig. 4 is a fragmentary top elevational view of a portion of the dispenser and cartridge shown in Fig. 3;

Fig. 5 is an elevational end view of the dispenser having a cartridge associated therewith; and Fig. 6 is a sectional view taken substantially along line 6—6 of Fig. 1.

As indicated previously, the invention relates to a dispenser for calking material and the like which includes a hand grip assembly having a manually operable mechanism for advancing a plunger through a calking material cartridge which cartridge may be readily attached and detached from the assembly. The invention contemplates the provision of a bail pivotally attached to the hand grip assembly to hold the cartridge in the seat during the advancement of the plunger through the cartridge. The bail comprises two legs adapted to straddle the cartridge and an intermediate cross portion interconnecting the outer leg ends and adapted to hold the cartridge in place. The intermediate portion is of a form such that it closely fits the discharge spout or nozzle associated with the cartridge and reinforces the nozzle against lateral pressure.

Although the invention could be employed in various forms of viscous material dispensers, it is particularly suitable for dispensers commonly known as "calking guns" by which calking material in tubular cartridge is injected into voids in walls and the like through suitable discharge spout or nozzle. Referring to the drawings, a calking gun is shown which comprises a plunger carrying hand grip assembly 15 with which a calking material cartridge 16 may be detachably connected to provide for expulsion of the calking material by the plunger. The cartridge 16 preferably comprises an inexpensive tube 18, which may be formed by spirally wound paperboard strips such as commonly used in forming mailing tubes, loaded with calking material and having one end closed by a flanged sheet metal disc 19 and the opposite end provided with a discharge spout structure. The closure disc 19 is frictionally held in the cartridge and serves as a piston to express the material from the cartridge when the plunger is forced thereagainst.

The spout structure preferably comprises a sheet metal disc 22 having an annular flange 23 formed about the periphery thereof into which the end of the tube 18 is tightly received. The disc 22 has a central opening through which a tapered spout 25 extends. The spout 25 preferably comprises a sheet metal strip rolled in a tapered tubular form having the base end flared as at 26, to engage the inner face of the disc 22, and the plane of the outer end edges of the spout preferably slopes at approximately 45° to the spout axis to enable the calking material to be more easily directed into apertures in surfaces. The spout may be attached to the plate 22 by any suitable means, such as soldering or forming a ridge 24 at the outer edge of the plate opening.

The discharge end of the cartridge tube 18 is preferably closed by a sheet metal disc 28, having a peripheral flange 29 frictionally engaging the cartridge interior. The disc 28 has a flap or door 30 formed at the central portion thereof, preferably by a die punch which cuts an arcuate pattern having an uncut segment 31 intermediate the ends thereof which segment forms the flap hinge. The cutting punch strikes the disc side which is to face the interior of the cartridge so that after the disc is installed, a moderate internal pressure inside the cartridge forces the flap outwardly. The disc 28 may be inserted into the spout end either before or after the calking material is loaded into the tube 18 and it serves to seal the discharge end of the cartridge until the cartridge is used. The spout structure may be attached to the tube 18 at the time the cartridge is loaded with material or just prior to installation in the dispenser.

Alternatively, the disc 28 may be omitted and the spout structure used to close the cartridge and in this event the spout 25 is preferably closed with a suitable plug 27, which is forced out of the spout by the initial flow of the calking material.

As mentioned, the tube 18 is preferably made of a suitable inexpensive material such as paperboard, so that after the cartridge has been emptied, it may be discarded. The closure discs and spout structures are not necessarily formed of sheet metal, but any other suitable inexpensive material could be employed.

The hand grip assembly 15 is similar to that disclosed in my co-pending application Serial No. 778,119, filed October 6, 1947, and it comprises in general, a handle 34 having forwardly extending portions which terminate in outturned flanges 35, 36 to which the inner wall of a socket member 38 is attached to form a seat for the reception of one end of cartridges like cartridge 16. The sides of the socket member 38 are formed by a plurality of resilient tongues 39 which are spaced from one another and which are adapted to resiliently grip a tubular cartridge inserted therein. The spaces between the tongues receive lugs which may project from certain types of cartridges suitable for connection with handle assemblies by a bayonet type connection.

The handle assembly 15 carries a manually operable plunger including a piston rod 40 slidably supported in aligned openings 41, 42 formed through the handle and the inner wall of the socket 38. The left-hand end of the rod 40 has a piston 43 attached thereto and the opposite end has a turned portion by which the rod can be grasped for retraction thereof.

A channel shaped hand lever or trigger 44 is pivoted on the handle by a pin 45, and the upper end of the trigger is provided with two spaced parallel lugs or ears 46, only one of which appears in the drawings, which are formed integral with the side sections of the trigger.

The trigger 44 is operatively connected with rod 40 by a one-way clutch comprising two plates 47, 48 having openings therethrough capable of loosely receiving the rod 40 to provide free relative movement between the rod and the plates when the plate planes are substantially normal to the rod axis, but when the plates are canted relative to the rod axis, the openings edges thereof grip the rod. Preferably, the plates 47, 48 are of harder metal than the rod 40 to insure firm gripping of the latter and to minimize wear. A coil spring 49 is disposed between the inner wall of socket 38 and plate 47 to urge the plates 47, 48 against stops 50, 51 which are struck inwardly from the sides of the handle. The trigger lugs engage the lower portion of the plate 48 and cant the plates to cause them to grip the rod and move the rod to the left when the trigger is drawn to the handle 34 by the operator gripping the handle and trigger. When the operator releases the trigger, the spring 49 returns the plates 47, 48 against stops 50, 51 and returns the trigger to its outward position, shown in full lines in Fig. 2. By alternately gripping and releasing the trigger, the rod 40 is forced step by step through a cartridge 16 secured in the socket 38 to express the calking material from the cartridge in the quantities desired.

To prevent outward movement or recession of the piston rod 40 by the spring 49 and pressures of the viscous material within the cartridge 16, a one-way clutch or catch is provided which comprises a metal strip 54 having one end offset and inserted in an opening formed in the handle 34 above the rod 40. The strip 54 has an opening which loosely receives rod 40 when the strip proper is substantially normal to the rod axis and when the strip is canted the edges of the opening grip the rod. The strip is yieldingly canted to the right by a coil spring 55 so that it normally grips the rod, and when the latter tends to move to the right, the grip is increased and the connection of the strip with the handle is effective to prevent recession of the rod from the cartridge. When the rod is moved to the left or advanced into the cartridge, the strip is moved toward a position normal to the rod axis, thereby releasing the opening edges from the rod. Thus, the piston rod 40 may be advanced step by step through cartridge 16 by reciprocation of the trigger and retrogression after each step is checked by the clutch strap.

The strip 54 can be operated to release the piston rod 40 for withdrawal of the latter from the cartridge by pressing the end of the strip extending below the rod strip against spring 55 to position it substantially normal to the rod axis. The free end of the strip 54 is disposed to be easily pressed by the thumb of the hand gripping the handle.

The cartridge 16 is secured to the hand grip assembly with the end closed by disc 19 in the socket 38 by a bail 60 which is pivotally attached to the hand grip assembly. The bail is preferably formed of resilient wire and comprises two parallel legs 61, 62 interconnected at their outer ends by an intermediate or interconnecting cross portion. The free or opposite ends of the legs are turned inwardly and journaled in openings provided by channels 65, 66 formed in the outturned hand grip flanges 35, 36. The inner ends of the channels are open and the tip ends of the legs are extended through the openings and turned to extend longitudinally of the bail to prevent accidental removal from the channels and to limit swinging movement of the bail to 180° by engaging the flanges 35, 36.

The intermediate bail portion extends across the outer end of a cartridge placed in the socket 38 and has a U-shaped portion 63 which is narrower than the cartridge diameter and has a section 64 extending along the outer end 22 of the cartridge to hold the cartridge in the seat 38. The closed portion 65 of the U-shape formation 63 is reversed relative to the section 64, and the end thereof projects forwardly to engage the side of the spout 25 at an angle to the spout axis and forms a brace to reinforce the spout against lateral pressure. Preferably, concave formations 67, 68 are provided in the U-shape portion 64 to embrace the sides of the spout 25 at the base thereof.

The forwardly projecting bail portion 65 not only braces the spout but in addition provides a hand grip by which the bail can be swung to and from the cartridge securing position. By forming the spout brace on the bail, the spout may be formed of relatively light, inexpensive material as it is reinforced by the outer end of the bail to withstand considerable stresses arising during use of the calking gun.

It will be apparent that the objects enumerated, as well as others, have been accomplished and that I have provided a new and improved dispensing device for calking material and the like which can be ejected from cartridges which are inexpensive and disposable after use and which serve as shipping containers for the calking material. The calking material cartridges can be readily attached to and removed from the hand grip assembly in operative relationship with the plunger.

While the preferred form of the invention has been described in considerable detail, it will be apparent that the invention is not limited to the constructions shown and it is my intention to cover hereby all adaptations, modifications and changes therein which come within the practice of those skilled in the art to which the invention relates and the scope of the appended claims.

Having thus described my invention, I claim:

1. In a dispenser for viscous material contained in a cartridge having a discharge end adapted to have a spout associated therewith, the combination of a hand grip assembly having a seat for receiving the other end of the cartridge, and means carried by said handle assembly for securing the cartridge in said seat, said means comprising a bail having the ends of the legs attached to said handle assembly and including a U-shaped cross member extending transversely of the discharge end of the cartridge in said seat and having a portion thereof engaging the discharge end of the cartridge, the loop portion of said cross member being bent reversely relative to the first mentioned portion thereof and extending outwardly of said bail and engageable with a spout associated with the discharge opening of the cartridge to form a brace for reinforcing the spout against lateral pressure, the legs of said bail being swingable to move said cross member to and from registration with the discharge end of the cartridge in said seat.

2. In a dispenser for viscous material contained in a cartridge having a discharge end adapted to have a spout associated therewith, the combination of a hand grip assembly having a seat for receiving the other end of the cartridge, and a wire bail having its open end pivotally attached to said handle assembly and having its closed end extendable transversely of the discharge end of the cartridge in said seat, said closed end being U-shaped and having a portion extending parallel to the cartridge discharge end and having a section including the loop of the U-shape turned back on said portion and engageable with a spout associated with the discharge opening of the cartridge.

3. In a dispenser for viscous material contained in a cartridge having a discharge end adapted to have a spout associated therewith, the combination of a hand grip assembly having a seat for receiving the other end of the cartridge, and a wire bail having its open end pivotally attached to said handle assembly and having its closed end extendable transversely of the discharge end of the cartridge in said seat, said closed end being U-shaped and having a portion extending parallel to the cartridge discharge end and having sides of the U-portion resiliently engaging opposite sides of a spout associated with the cartridge and having a section including the loop of the U-shape turned back on said portion and forming a projection extending outwardly of said portion and engageable with a spout associated with the discharge opening of the cartridge.

4. In a dispenser for viscous material contained in a cartridge having a discharge spout at one end thereof, the combination of a hand grip assembly having a seat for receiving the other end of the cartridge, and means carried by said handle assembly for securing the cartridge in said seat, said means including a bail having parallel legs pivoted to the handle assembly and a portion interconnecting the bail legs and engageable with the spout end of the cartridge in said seat, said interconnecting portion having a projection extending outwardly of said interconnecting portion and engageable with said spout to brace said spout against lateral stresses.

5. In a dispenser for viscous material contained in a cartridge having a discharge spout at one end thereof, the combination of a hand grip assembly having a seat for receiving the other end of the cartridge, and means carried by said handle assembly for securing the cartridge in said seat, said means including a wire bail having parallel legs pivoted to the handle assembly and the portion interconnecting the bail legs being engageable with the spout end of the cartridge in said seat, said interconnecting portion having a U-shape formation a portion of which is adapted to extend in a plane transversely of the spout axis and to resiliently engage opposite sides of said spout and a section of said formation including the closed end reversed relative to the spout engaging portion and extending outwardly of the bail and engaging said spout to provide a brace against lateral pressures on said spout.

6. A cartridge for viscous material comprising a relatively rigid tubular body, a closure member at one end of said body adapted to be moved through the body to expel material from the other end of said body, and a relatively thin metal closure plate at said other end of said body having a central portion cut from said plate to form a flap attached to the plate proper by an uncut segment, said flap being cut to swing from the plate toward the said other end.

7. In a dispenser for viscous material, a hand grip assembly including a sheet metal handle having opposite sides interconnected by a rear wall, a seat for receiving one end of a cartridge containing viscous material and means for attaching the cartridge in the seat, a rod carried by said assembly and adapted to move axially into a cartridge in said seat, a trigger member carried by said assembly, means interconnecting said trigger and rod for advancing said rod into the cartridge when said trigger is moved in one direction, and means to check reverse movement of said rod comprising a strip having one end portion offset from the strip proper, said rear wall of said handle having an opening through which said offset portion projects whereby the strip proper is on the exterior of said rear wall and the offset portion thereof engages the inside of said rear wall, said strip having an opening loosely receiving said rod when said strip is in one angular position relative to the rod and for gripping said rod with the edges thereof when said strip is canted relative to said one position, said strip having a free end extending downwardly adjacent to the hand grip and a spring surrounding said rod and interposed between said rear wall and strip to urge said strip outwardly.

8. In a dispenser for viscous material contained in a cartridge having a discharge spout at one end thereof, the combination of a hand grip assembly having a seat for receiving the other end of the cartridge, and means carried by said handle assembly for securing the cartridge in said seat, said means including a bail having parallel legs connected at the open ends of the bail to said handle assembly and adapted to swing the outer closed end of said bail into and out of registration with the spout end of a cartridge in said seat, said closed end of said bail having a part engageable with said spout end of the cartridge to hold the cartridge in said seat and having a projection extending outwardly and adapted to engage the outside of one side of the spout associated with the cartridge and brace the spout against lateral stresses.

WILLIAM A. SHERBONDY.

REFERENCES CITED

The following references are of record in the file of this patent:

UNITED STATES PATENTS

| Number | Name | Date |
| --- | --- | --- |
| 679,983 | O'Neil | Aug. 6, 1901 |
| 845,530 | Davis | Feb. 26, 1907 |
| 1,466,256 | Stelter | Aug. 28, 1923 |
| 1,512,294 | Marcy | Oct. 21, 1924 |
| 1,729,219 | Kellogg | Sept. 24, 1929 |
| 2,354,649 | Bruckner | Aug. 1, 1944 |
| 2,367,346 | Good | Jan. 16, 1945 |
| 2,582,156 | Peterson | Jan. 8, 1952 |

FOREIGN PATENTS

| Number | Country | Date |
| --- | --- | --- |
| 668 of 1926 | Austriala | Feb. 22, 1927 |